United States Patent
Marrocco et al.

(10) Patent No.: US 12,157,221 B2
(45) Date of Patent: Dec. 3, 2024

(54) SYSTEM AND METHOD FOR APPLYING THERMAL INTERFACE MATERIAL TO A TRAY OF AN ELECTRIC VEHICLE BATTERY PACK

(71) Applicant: Ford Global Technologies, LLC, Dearborn, MI (US)

(72) Inventors: Alexander Marrocco, Windsor (CA); Francis Maslar, Grosse Ile, MI (US); Daniel Ondrus, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 17/573,898

(22) Filed: Jan. 12, 2022

(65) Prior Publication Data

US 2023/0219234 A1    Jul. 13, 2023

(51) Int. Cl.
| | |
|---|---|
| *B25J 11/00* | (2006.01) |
| *B25J 9/16* | (2006.01) |
| *B25J 13/08* | (2006.01) |
| *B25J 15/00* | (2006.01) |
| *G06T 7/00* | (2017.01) |
| *G06T 7/70* | (2017.01) |
| *H01M 10/625* | (2014.01) |
| *H01M 10/653* | (2014.01) |

(52) U.S. Cl.
CPC ......... *B25J 11/0075* (2013.01); *B25J 9/1697* (2013.01); *B25J 13/08* (2013.01); *B25J 15/0019* (2013.01); *G06T 7/0006* (2013.01); *G06T 7/70* (2017.01); *H01M 10/625* (2015.04); *H01M 10/653* (2015.04); *H01M 2220/20* (2013.01)

(58) Field of Classification Search
CPC ...... B25J 11/0075; B25J 9/1697; B25J 13/08; B25K 15/0019; G06T 7/70; H01M 10/625; H01M 10/653; H01M 2220/20
USPC ................................................. 700/146, 259
See application file for complete search history.

(56) References Cited

U.S. PATENT DOCUMENTS

| | | | |
|---|---|---|---|
| 7,094,299 B2 * | 8/2006 | Ondrus | B62D 29/002 264/46.7 |
| 8,520,929 B1 | 8/2013 | Murray et al. | |
| 9,839,159 B1 | 12/2017 | Banijamali | |
| 2007/0090132 A1 * | 4/2007 | Williams | B67D 7/0233 222/386 |
| 2017/0266876 A1 * | 9/2017 | Hocker | B29C 64/106 |

(Continued)

FOREIGN PATENT DOCUMENTS

WO    2021079194    4/2021

*Primary Examiner* — Md Azad
(74) *Attorney, Agent, or Firm* — Burris Law, PLLC

(57) ABSTRACT

A system for providing a thermal interface material on a tray for an electric vehicle battery includes a material dispensing system (MDS) and a vision system. The MDS includes a set of pumps, a robotic dispensing system (RDS), and a controller. The set of pumps includes a first pump to house a first material and a second pump to house a second material different from the first material. The RDS is fluidly coupled to the set of pumps and dispenses a third material on the tray in a defined pattern, where the third material is a mixture of the first and second materials. The vision system is configured to capture a first set of images. The controller is configured to determine a nozzle offset of the RDS based on the first set of images and control a position of the RDS based on the nozzle offset.

18 Claims, 4 Drawing Sheets

(56) References Cited

U.S. PATENT DOCUMENTS

2021/0402961 A1* 12/2021 Agrotis ..................... B60S 1/54
2022/0410847 A1* 12/2022 Agrotis ................... B05B 9/002

* cited by examiner

SYSTEM AND METHOD FOR APPLYING THERMAL INTERFACE MATERIAL TO A TRAY OF AN ELECTRIC VEHICLE BATTERY PACK

FIELD

The present disclosure relates to system and method for manufacturing an electric vehicle battery pack with thermal interface material.

BACKGROUND

The statements in this section merely provide background information related to the present disclosure and may not constitute prior art.

In electric vehicles (EV), the charging and discharging of an array of batteries (i.e., battery array) generates thermal energy (i.e., heat) that needs to be managed, so as to not affect the performance of the EV. In some applications, a liquid dispensed gap filler, such as a thermal interface material (TIM), is provided between the underside of the battery array and a surface of a tray (e.g., cold plate(s) and/or pack tray(s)). Heat is transferred from the battery array to the tray, where coolant is circulated through internal cavity(s) of the tray.

Prior to the battery array being installed, the TIM is applied on the tray with no skips or gaps in order to meet EV thermal performance targets. However, the TIM can be challenging to apply in EV manufacturing. For example, 2-component liquid TIM is made of resin and hardener materials that are cured via a catalyst reaction, and may have short shelf-life. In particular, a silicone based 2-component TIM is dense and highly abrasive with a 6 month shelf life. In addition, the precise application of the TIM is to be done in a repetitive and in some applications, in short application time to meet manufacturing demands. These and other issues related to the application of TIM is addressed by the present disclosure.

SUMMARY

This section provides a general summary of the disclosure and is not a comprehensive disclosure of its full scope or all of its features.

In one form, the present disclosure is related to a system for providing a thermal interface material on a tray for an electric vehicle battery. The system includes a material dispensing system and a vision system. The material dispensing system includes a set of pumps, a robotic dispensing system, and a controller. The set of pumps includes a first pump to house a first material and a second pump to house a second material different from the first material. The robotic dispensing system is fluidly coupled to the set of pumps and includes a robotic arm and an end-effector tool having a mixing vessel and a nozzle fluidly coupled to the mixing vessel. The nozzle is configured to dispense a third material on the tray in a defined pattern, where the third material is a mixture of the first material and the second material. The controller is configured to control operation of the material dispensing system. The vision system includes a set of imaging devices configured to capture a first set of images of the nozzle in association with the tray. The controller is configured to determine a nozzle offset of the nozzle based on the first set of images and control a position of the nozzle relative to the tray based on the nozzle offset.

In one form, the material dispensing system further includes a thermal system that includes a first heated conduit and a second heated conduit. The first heated conduit is fluidly coupled to the first pump and the end-effector tool and is configured to provide the first material to the end-effector tool at a first desired temperature. The second heated conduit is fluidly coupled to the second pump and the end-effector tool and is configured to provide the second material to the end-effector tool at a second desired temperature.

In one form, the controller is configured to control the robotic dispensing system to dispense the third material in a serpentine shape, as the defined pattern, on the tray.

In one form, the controller is configured to determine whether an idle time has lapsed and issue a purge notification to have a cleanse action performed on the end-effector tool in response to the idle time lapsing.

In one form, the cleanse action includes removing the third material from the end-effector tool, providing a notification of the cleanse action, or a combination thereof.

In one form, the set of imaging devices is further configured to capture a second set of images of the defined pattern of the third material on the tray, and the controller is configured to determine whether the defined pattern satisfies one or more desired characteristics based on the second set of images.

In one form, the one or more desired characteristics includes a bead width, a bead length, overall dimension of the defined pattern, or a combination thereof.

In one form, the set of imaging devices includes one or more three-dimensional imaging devices, one or more two-dimensional imaging devices, or a combination thereof.

In one form, the set of imaging devices includes a first set of imaging devices configured to capture the first set of images, and a second set of images configured to capture the second set of images.

In one form, the present disclosure is directed to a system for providing thermal interface material on a tray for an electric vehicle battery. The system includes a material dispensing system and a vision system. The material dispensing system includes a set of pumps, a robotic dispensing system, a thermal system, and a controller. The set of pumps includes a first pump to house a first material and a second pump configured to house a second material different from the first material. The robotic dispensing system is fluidly coupled to the set of pumps and includes a robotic arm and an end-effector tool having a mixing vessel and a nozzle fluidly coupled to the mixing vessel. The nozzle is configured to dispense a third material on the tray in a defined pattern, where the third material is a mixture of the first material and the second material. The thermal system includes a first heated conduit and a second heated conduit. the first heated conduit is fluidly coupled to the first pump and the end-effector tool and is configured to provide the first material to the end-effector tool at a first desired temperature. The second heated conduit is fluidly coupled to the second pump and the end-effector tool and is configured to provide the second material to the end-effector tool at a second desired temperature. The controller is configured to control operation of the material dispensing system. The vision system includes a set of imaging devices configured to capture a first set of images of the nozzle in association with the tray and a second set of images of the defined pattern on the tray. The controller is configured to determine a nozzle offset of the nozzle based on the first set of images and control a position of the nozzle relative to the tray based on the nozzle offset. The nozzle offset is based on a distance between the nozzle and the tray. The controller is configured to determine whether the defined pattern satisfies one or more desired characteristics based on the second set of images.

In one form, the controller is configured to control the robotic dispensing system to dispense the third material in a serpentine shape, as the defined pattern, on the tray.

In one form, the controller is configured to determine whether an idle time has lapsed and issue a purge notification to have a cleanse action performed on the end-effector tool in response to the idle time lapsing.

In one form, the cleanse action includes removing the third material from the end-effector tool, providing a notification of the cleanse action, or a combination thereof.

In one form, the one or more desired characteristics includes characteristics indicative of a bead width, a bead length, or a combination thereof.

In one form, the set of imaging devices includes one or more three-dimensional imaging devices, one or more two-dimensional imaging devices, or a combination thereof.

In one form, the set of imaging devices includes a first set of imaging devices configured to capture the first set of images and a second set of imaging devices configured to capture the second set of images.

In one form, the present disclosure is directed to a method of assembling a vehicle battery pack on a tray with a material dispensing system and a vision system. The material dispensing system includes a set of pumps, a robotic dispensing system, and a controller. The method includes providing a first material in a first pump and a second material in a second pump, where the set of pumps includes the first pump and the second pump. The method further includes operating, by the controller, the robotic dispensing system and the set of pumps to dispense a third material from a nozzle of an end-effector tool on a tray in a defined pattern. The robotic dispensing system is fluidly coupled to the set of pumps and includes a robotic arm and the end-effector tool having a mixing vessel and the nozzle fluidly coupled to the mixing vessel. The third material is a mixture of the first material and the second material. The method further includes capturing, by a set of imaging devices of the vision system, a first set of images of the nozzle in association with the tray. The method further includes determining, by the controller, a nozzle offset based on the first set of images, controlling, by the controller, a position of the nozzle relative to the tray based on the nozzle offset as the third material is being dispensed. The method further includes capturing, by the set of imaging devices of the vision system, a second set of images of the tray having the third material with the defined pattern. The method further includes determining, by the controller, whether the defined pattern satisfies one or more desired characteristics based on the second set of images, where the one or more desired characteristics includes characteristics indicative of a bead width, a bead length, or a combination thereof. The method further includes identifying, by the controller, the tray as being defective in response to the defined pattern no satisfying the one or more desired characteristics.

In one form, the method further includes controlling, by a thermal system, a temperature of the first material to a first desired temperature and a temperature of the second material to a second desired temperature. The thermal system includes a first heated conduit to provide the first material to the mixing vessel at the first desired temperature, and a second heated conduit to provide the second material to the mixing vessel at the second desired temperature.

In one form, the defined pattern is a serpentine shape.

In one form, the method further includes determining, by the controller, whether an idle time has lapsed; and issuing, by the controller, a purge notification to have a cleanse action performed on the end-effector tool in response to the idle time lapsing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
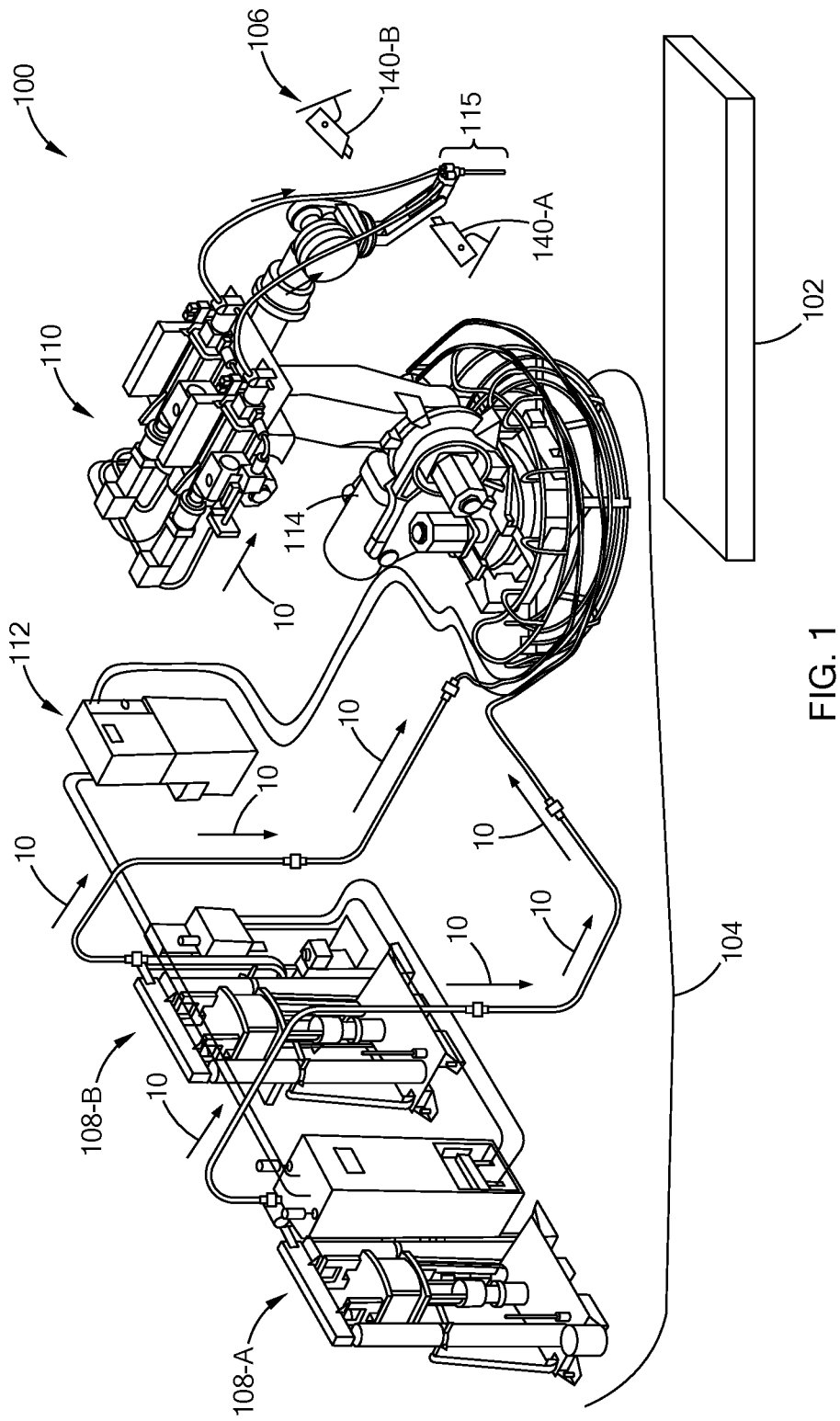
FIG. 1 illustrates an application system for providing a liquid thermal interface material (TIM) on an electric vehicle (EV) tray, in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an application system that merges robotics, a 2-component TIM dispensing system, and an inspection system to provide a flexible automated system for applying liquid TIM. More particularly, in one form, the system includes a material dispensing system and a vision system. The material dispensing system includes a set of pumps for separately housing a first material and a second material that form the TIM, and a robotic dispensing system fluidly coupled to the set of pumps. The robotic dispensing system includes a controller, a robotic arm, and an end-effector tool having a mixing vessel and a nozzle fluidly coupled to the mixing vessel. The vision system captures a first set of images of the nozzle in association with the tray. The controller is configured to determine a nozzle offset of the nozzle based on the first set of images and control a position of the nozzle relative to the tray based on the nozzle offset. The nozzle is controlled to dispense the TIM on the tray in a defined pattern. Once applied, the vision system captures a second set of images of the tray and the controller inspects the defined pattern. In some applications, a thermal system is provided to control the temperature and thus, the properties of the first and second materials. The application system provides an automated application and inspection system that improves manufacturing efficiency and quality of the TIM. The system is also adaptable for different vehicle makes and type. These and other advantages may be provided by the application system of the present disclosure.

Figure 2:
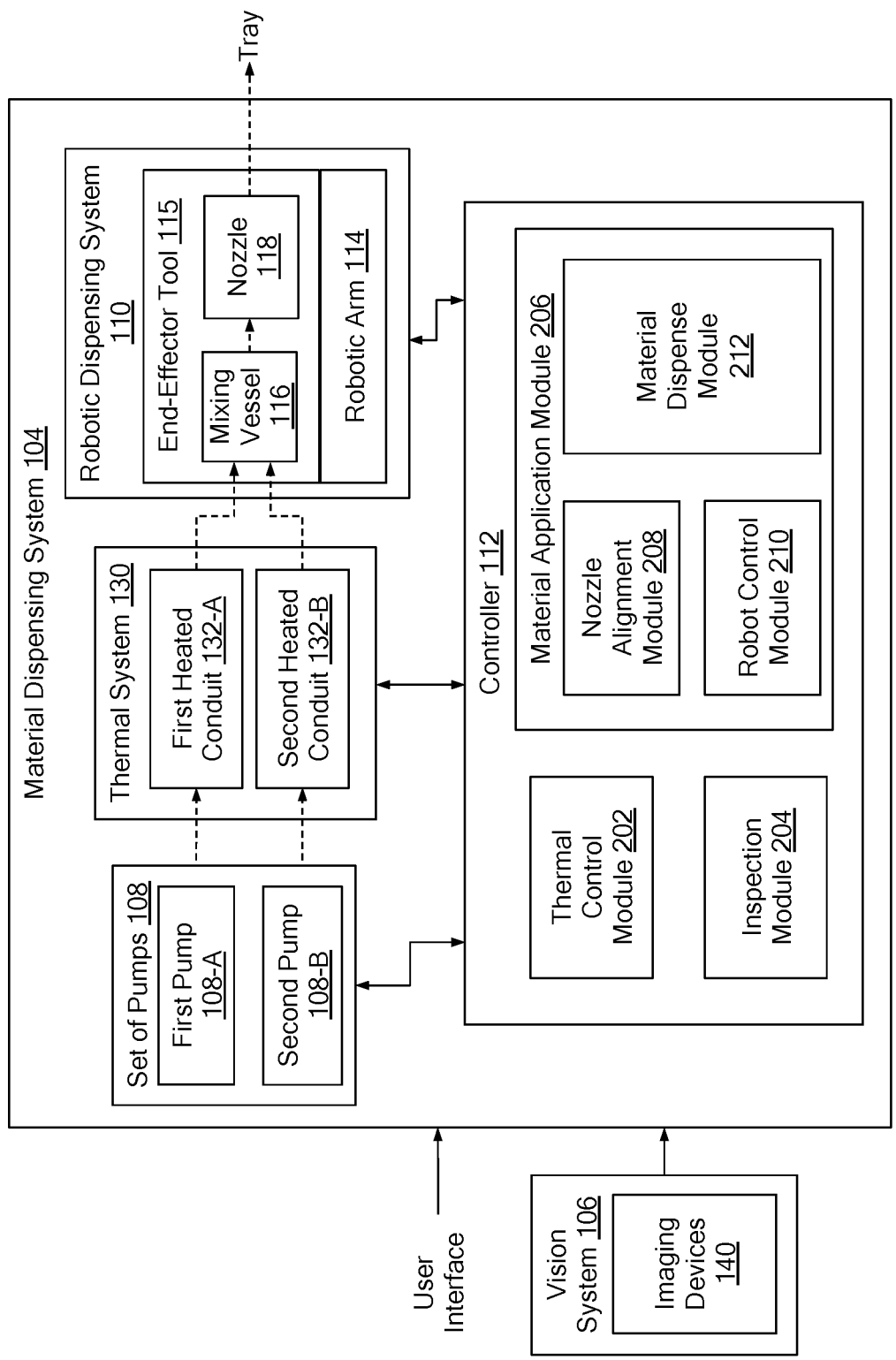
FIG. 2 is a block diagram of the system of FIG. 1.

Referring to FIGS. 1 and 2, an example application system 100 for providing a thermal interface material (TIM) on a tray 102 for an electric vehicle battery array is illustrated. In FIG. 1 solid arrows 10 represent flow of material and in FIG. 2, dashed lines represent flow of material and solid lines represent data/commands.

The system 100 includes a material dispensing system 104 for applying the TIM to the tray 102 and a vision system 106 for capturing images of the application of the TIM onto the 102. In one form, the material dispensing system 104 includes a set of pumps 108-A and 108-B (collectively "pumps 108"), a robotic dispensing system 110, and a controller 112. The pumps 108 includes a first pump 108-A to house a first material (e.g., a resin or a hardener) and a second pump 108-B to house a second material different from the first material (e.g., the other one of the resin or the hardener). In this arrangement, the first material and the second material forming the TIM are housed separately until it is time for applying the TIM to the tray 102.

The robotic dispensing system 110 is fluidly coupled to the pumps 108, and in one form, includes a robotic arm 114 and an end-effector tool 115 that includes a mixing vessel 116 and a nozzle 118 fluidly coupled to the mixing vessel 116. In an example application, the robotic arm 114 is provided as a multi-axal industrial robotic arm (e.g., 6-degrees of freedom) with the end-effector tool 115 arranged thereon.

Figure 3:
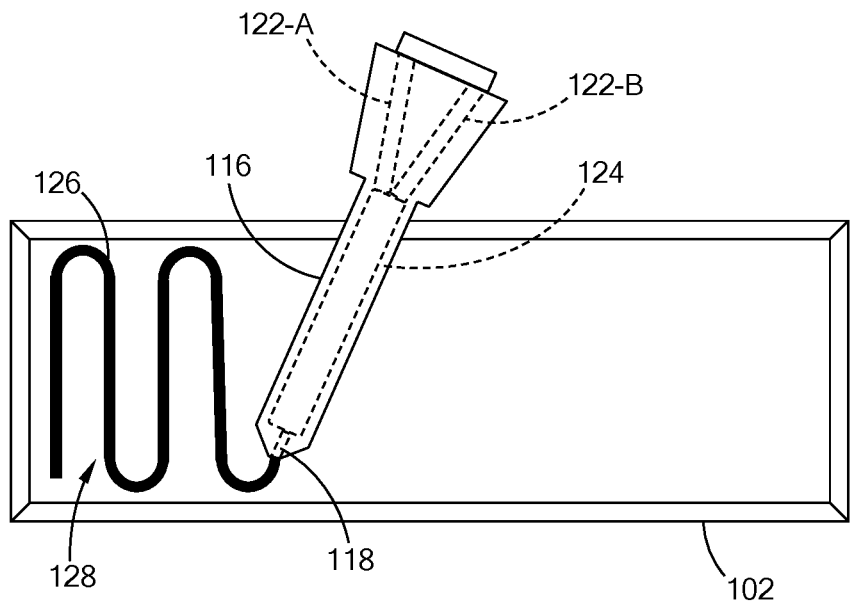
FIG. 3 illustrates a mixing vessel and a nozzle, in accordance with present disclosure.

Referring to FIG. 3, in one form, the mixing vessel 116 includes two channels 122-A and 122-B (collectively "channels 122") that are fluidly coupled to the pumps 108 to receive the first material and the second material. The mixing vessel 116 further includes a chamber 124 in which the first material and the second material are combined to form the TIM (i.e., a third material 126). The nozzle 118 is configured to dispense the TIM on the tray 102 in a defined pattern 128. The end-effector tool 115 may include other components for controlling (i.e., allowing/stopping) the flow of TIM, such as, but not limited to, a valve, a needle, and/or a spring.

In one form, the material dispensing system 104 further includes a thermal system 130 to control the temperature of the first material and the second material. Specifically, the viscosity of the 2-part TIM may vary based on various factors such as, but not limited, to lot-to-lot material difference, temperature of the plant/facility, temperature of the pump, nozzle 118, maximum dispensing pressures, among other factors. Accordingly, the thermal system 130 reduces or inhibits variation in the viscosity and/or thermal properties of the first material and the second material, and thus, the TIM. In one form, the thermal system 130 includes a first heated conduit 132-A and a second heated conduit 132-B (collectives "heated conduits 132"). In an example application, the heated conduits 132 may be provided as a hose having an integrated heater or a hose with a heater wrapped around the hose. The first heated conduit 132-A is fluidly coupled to the first pump 108-A and the mixing vessel 116 and the second heated conduit 132-B is fluidly coupled to the second pump 108-B and the mixing vessel 116. The first heated conduit 132-A is configured to provide the first material to the mixing vessel 116 at a first desired temperature and the second heated conduit 132-B is configured to provide the second material to the mixing vessel 116 at a second desired temperature, where the first temperature and the second temperature may be the same or different based on the material property of the first material and the second material. In an example application, the first temperature and the second temperature may be selected between 30-40° C.

The vision system 106 includes a set of imaging devices 140 to capture images of the nozzle 118 and/or the tray 102. In an example application, the set of imaging devices 140 includes a first set of imaging devices 140-A (e.g., one or more imaging devices 140-A, FIG. 1) and a second set of imaging devices 140-B (e.g., one or more imaging devices 140-B, FIG. 1). The first set of imaging devices 140-A is configured to capture a first set of images of the nozzle 118 and the tray 102 to provide a positional relationship between the nozzle 118 and the tray 102. The second set of imaging devices 140-B is configured to capture a second set of images of the defined pattern 128 on the tray 102. As described herein, the controller 112 employs the first set of images and the second set of images to control the position of the nozzle 118 relative to the tray 102 and to assess the quality of the defined pattern, respectively.

In one form, the set of imaging devices 140 includes multi-dimensional (e.g., 2D or 3D) cameras and/or scanners. For example, the first set of imaging devices 140 may include one or more 3D scanners to define a 3D point cloud and perform 3D pattern matching to locate the tray 102, and the second set of imaging devices 140 may include 2D cameras to capture images of the tray 102 and perform a visual inspection of the defined pattern 128. It should be readily understood that the position and/or number of imaging devices 140 can be modified and should not be limited to the figures. For example, in one application, one imaging device 140 may be employed to capture the first set of images and the second set of images by having the imaging device provided on a moveable arm (e.g., the robotic arm 114 or other movable arm) that can adjust the position of the imaging device 140. In another example, the imaging devices 140 may be mounted on the robotic arm 114, mounted external of the robotic arm 114, or a combination thereof.

With continuing reference to FIGS. 1 and 2, the controller 112 is configured to control operation of the material dispensing system 104 to dispense the TIM onto the tray 102 in the defined pattern 128 and perform an inspection of the tray 102 once the TIM is applied. In one form, the controller 112 is configured to include a thermal control module 202, a material application module 206, and an inspection module 204. It should be readily understood that any one of the modules of the controller 112 can be provided at the same location or distributed at different locations (e.g., via one or more computing devices) and communicably coupled accordingly (e.g., wired or wireless).

In one form, the thermal control module 202 is configured to set the value of the first temperature and the second temperature to control the material property, such as viscosity, of the first material and the second material. In one example, the thermal control module 202 may receive an input from a user via a user interface such as a computing device in communication with the controller 112. In another example, the thermal control module 202 is configured to select the first and second temperatures based on predetermined information that may associate one or more factors to a desired material temperature. For example, a temperature of the environment around the system 100 is correlated to a desired first temperature and a desired second temperature. Accordingly, the thermal control module 202 may include a table that correlates various environmental temperatures with desired first and second temperatures and selects the first and second temperature based on a current environmental temperature, which can be detected by a temperature sensor in the environment having the system 100. In lieu of a table, the thermal control module 202 may include a series of algorithms that provide a mathematical relationship between the desired first and second temperatures based on one or more known or measurable factors such as the environment temperature.

Figure 4:
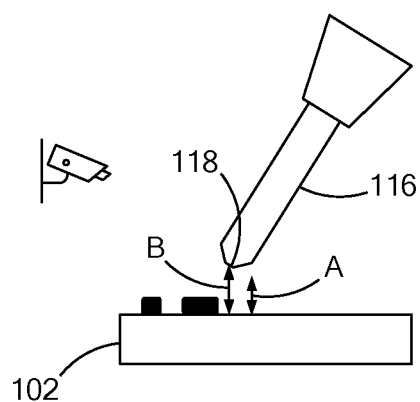
FIG. 4 illustrates a position of the nozzle relative to a surface of a tray in accordance with the present disclosure.

The material application module 206 is configured to control the set of pumps and the robotic dispensing system to apply the TIM to the tray 102 during an application cycle (i.e., automated cycle for applying TIM in the defined pattern). In one form, the material application module 206 is configured to include a nozzle alignment module 208, a robot control module 210, and a material dispense module 212. The nozzle alignment module 208 is configured to align the position of the nozzle 118 with reference to the tray 102 using the first set of images from the vision system 106. More particularly, the nozzle alignment module 208 is configured to identify the nozzle 118 and the tray 102 within the first set of images using known image recognition techniques. For example, if 3D scanners are employed as the imaging devices 140-A, the nozzle alignment module 208 is configured to construct a 3D point cloud of the area having, at least, the tray 102 and the nozzle 118. The nozzle alignment module 208 further calculates a nozzle offset, which is indicative of an offset of a distance between the nozzle 118 and the surface of the tray 102 from a desired distance. For example, referring to FIG. 4, line A represents the desired distance and line B represents a current distance. The nozzle alignment module 208 determines if the nozzle offset satisfies an offset threshold, which may be a value or a range. More particularly, if the nozzle 118 is too close to the surface of the tray 102, an excessive amount of TIM may accumulate or forcefully flow onto the tray 102. On the other hand, if the nozzle 118 is too far away, the TIM may begin to spiral prior to contacting the tray 102. In one form, the offset threshold and the desired distance are determined via experimentation as it is dependent upon various factors such as, but not limited to, temperature of the material(s) (first material, second material, TIM), rate at which material is dispensed, arrangement of the tray 102 relative to the nozzle 118. If the nozzle offset does not satisfy the offset threshold, the nozzle alignment module 208 determines an adjustment value of the position of the nozzle 118 to have the nozzle 118 satisfy the offset threshold. In one application, the nozzle alignment module 208 is configured to calculate coordinates of the nozzle 118 to have the nozzle 118 within the offset threshold, and provides the coordinates to the robot control module 210.

The robot control module 210 is configured to operate the robotic arm 114 to move the nozzle 118 along a defined path keeping the nozzle 118 within the threshold range based on data from the nozzle alignment module 208 (e.g., the adjustment value and/or the updated coordinates). For example, the robot control module is configured to drive motors and/or actuators provided in the robotic arm 114 to control position of end-effector tool 115 and more particularly, the nozzle 118. In one form, the defined path is based on the defined pattern of the TIM onto the tray 102.

The material dispense module 212 is configured to operate the set of pumps and, if provided, valves within the mixing vessel 116 and/or nozzle 118 to apply the TIM to the tray 102 as the robot control module 210 moves the robotic arm 114. In one form, the material dispense module 212 is configured to receive positional information of the nozzle 118 from the nozzle alignment module 208 and operate the pumps 108 when the nozzle 118 is at predefined positions (e.g., at specific coordinates) to dispense the TIM. The material dispense module 212 may be configured in various suitable ways for applying the TIM, such as using the 3D point cloud for tracking the position of the nozzle and associating the position with the defined pattern to be applied onto the tray 102.

The defined pattern of the TIM can include, but is not limited to a serpentine shape, multiple parallel lines of the same or different lengths, saw tooth pattern, among others. In particular, a bead shape and pattern of the TIM may be selected to reduce duty cycle on components within the end-effector tool 115 such as the valves, and further improve the time it takes to apply the TIM. For example, a serpentine pattern may be performed in a single continuous stroke by the robotic arm 114, whereas multiple unconnected parallel lines employ multiple strokes in which valves are opened and closed for each line, thus decreasing life of the end-effector tool 115. In addition, the defined pattern is configured to inhibit a wet-out condition of the TIM, which can be determined via experimentation.

In some applications, the material dispense module 212 is further configured to monitor an idle time of the material dispensing system 104 and, in response to the idle time passing, issue a purge notification to have a cleanse action performed on the end-effector tool 115 and more particularly, on at least one of the mixing vessel 116 and the nozzle 118. Specifically, once mixed, the TIM cures within a certain time period, and thus, if the TIM remains in the mixing vessel 116 and nozzle 118 for too long, the TIM can harden causing damage to the mixing vessel 116 and/or nozzle 118 and may further require downtime of the system to remove the TIM and if needed, repair any damage to components of the end-effector tool 115. Accordingly, the idle time is selected to reduce or inhibit curing of the TIM (e.g., idle time can be 10 mins if the TIM cures within 15 mins). In an example application, the cleanse action may include dispensing old TIM in the mixing vessel 116 and nozzle 118 in a disposal area (e.g., a bin) and mix new TIM in the mixing vessel 116. In one form, the disposal of the old TIM can be performed automatically and the material dispense module 212 may issue a purge notification to provide information related to the cleanse action such as when the idle time lapsed and a date-time of the cleanse action to the user via the user interface. In addition to or in lieu of the disposal of TIM, the cleanse action may include replacing the mixing vessel 116 and nozzle 118 with a new mixing vessel 116 and a new nozzle 118, which can be done by a technician or automatically by the robotic arm 114. In response to the cleanse action being completed, the material dispense module 212 is configured to perform a dynamic mix calibration to mix the TIM in the mixing vessel 116 at different mix speeds and dispose the TIM from the nozzle 118 at least once. In doing so, the material dispense module 212 collects data on the characteristics of the TIM such as viscosity, amount of TIM being dispense in a given time, among other information that can be used for controlling the rate at which the TIM is being dispensed.

Once an application cycle is completed, the inspection module 204 is configured to determine whether the defined pattern satisfies one or more desired characteristics based on the second set of images. More particularly, in one form, the inspection module receives images of the tray 102 having the TIM and performs a visual inspection of the pattern. The one or more desired characteristics includes, but is not limited to: a bead width, a bead length, and/or overall dimension of the pattern on the tray 102. If one or more desired characteristics is not met, the tray 102 is identified as being defective and may be directed to a defect location. In some variations, if set number of defective trays 102 are detected, the inspection module 204 is configured to issue a notification indicating that the system 100 needs to be inspected.

Figure 5:
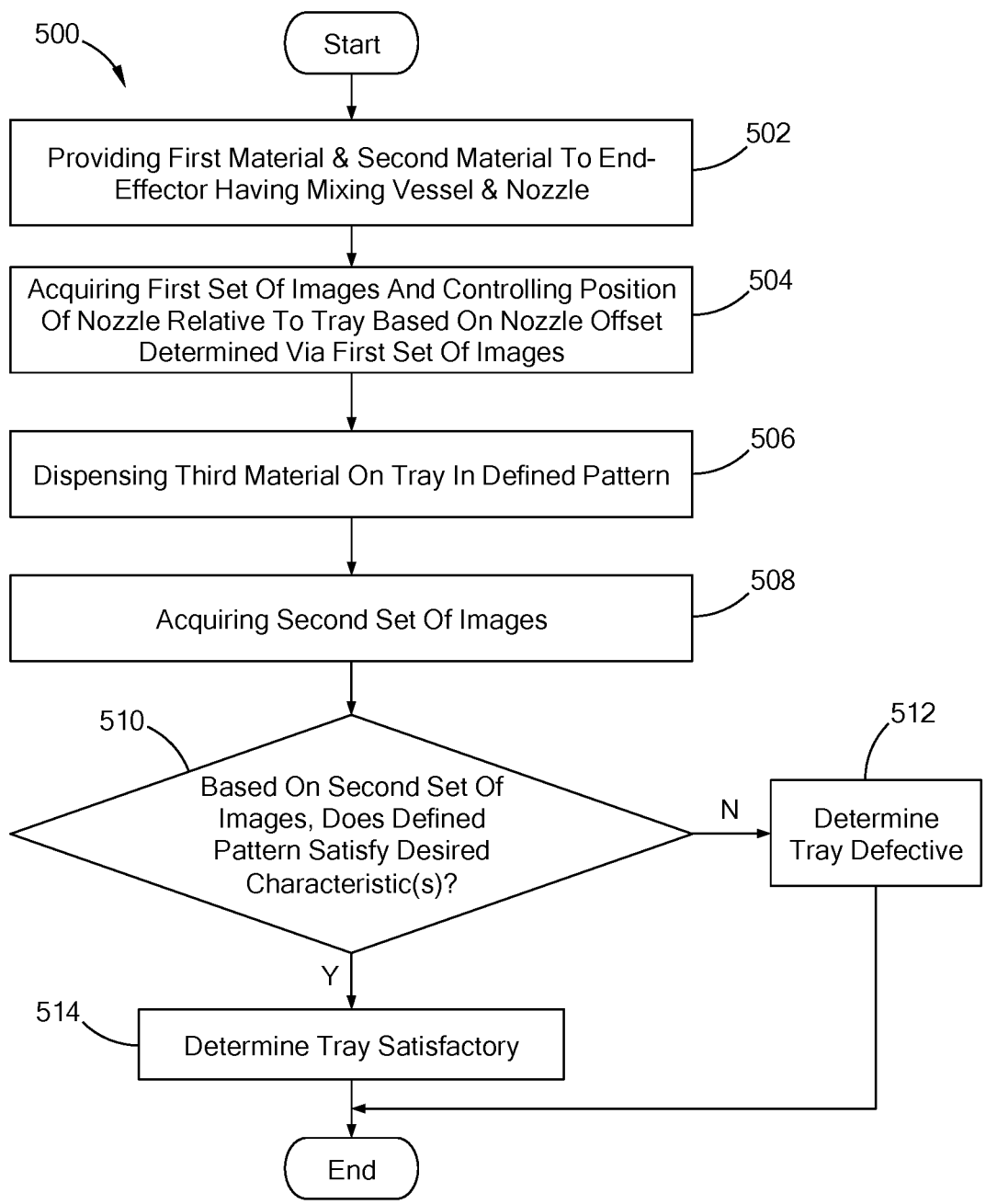
FIG. 5 is a flowchart of an example application control routine, in accordance with the present disclosure.

Referring to FIG. 5, an example application control routine executed by the application system of the present disclosure is provided. At 502, the system provides the first material and the second material from the set of pumps to the robotic dispensing system and more particularly, the end-effector having the mixing vessel and the nozzle. At 504, the system acquires a first set of images and controls the position of the nozzle relative to the tray based on a nozzle offset that is determined via the first set of images. At 506, the system dispenses the third material (i.e., the TIM) on the tray in a defined pattern and, at 508, acquires a second set of images. At 510, the system determines if the defined pattern satisfies a desired characteristic(s) based on the second images, as described above. At 512, if the desired characteristic(s) is not satisfied, the tray is determined to be defective and can be placed at designated area. At 514, if the desired characteristic(s) is satisfied, the tray is determined to be satisfactory, and the tray is moved to the next step of manufacturing.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for providing thermal interface material on a tray for an electric vehicle battery, the system comprising:
   a material dispensing system including:
      a set of pumps including a first pump to house a first material and a second pump to house a second material different from the first material; and
      a robotic dispensing system fluidly coupled to the set of pumps, wherein the robotic dispensing system includes a robotic arm and an end-effector tool having a mixing vessel and a nozzle fluidly coupled to the mixing vessel, wherein the nozzle is configured to dispense a third material on the tray in a defined pattern, wherein the third material is a mixture of the first material and the second material, and
   a controller configured to control operation of the material dispensing system; and
   a vision system including a set of imaging devices configured to capture a first set of images of the nozzle in association with the tray,
   wherein the controller is further configured to:
   determine that a nozzle offset of the nozzle does not satisfy an offset threshold based on the first set of images,
   determine an adjustment value of a position of the nozzle in response to the nozzle offset not satisfying the offset threshold, and
   control the position of the nozzle relative to the tray based on the adjustment value of the position of the nozzle.

2. The system of claim 1, wherein the material dispensing system further includes a thermal system that includes:
   a first heated conduit fluidly coupled to the first pump and the end-effector tool, wherein the first heated conduit is configured to provide the first material to the end-effector tool at a first desired temperature; and
   a second heated conduit fluidly coupled to the second pump and the end-effector tool, wherein the second heated conduit is configured to provide the second material to the end-effector tool at a second desired temperature.

3. The system of claim 1, wherein the controller is configured to control the robotic dispensing system to dispense the third material in a serpentine shape, as the defined pattern, on the tray.

4. The system of claim 1, wherein the controller is configured to determine whether an idle time has lapsed and issue a purge notification to have a cleanse action performed on the end-effector tool in response to the idle time lapsing.

5. The system of claim 4, wherein the cleanse action includes removing the third material from the end-effector tool, providing a notification of the cleanse action, or a combination thereof.

6. The system of claim 1, wherein:
   the set of imaging devices is further configured to capture a second set of images of the defined pattern of the third material on the tray, and the controller is configured to determine whether the defined pattern satisfies one or more desired characteristics based on the second set of images, wherein the one or more desired characteristics includes a bead width, a bead length, overall dimension of the defined pattern, or a combination thereof.

7. The system of claim 1, wherein the set of imaging devices includes one or more three-dimensional imaging devices, one or more two-dimensional imaging devices, or a combination thereof.

8. The system of claim 1, wherein the set of imaging devices includes:
a first set of imaging devices configured to capture the first set of images, and
a second set of images configured to capture the second set of images.

9. A system for providing thermal interface material on a tray for an electric vehicle battery, the system comprising:
a material dispensing system including:
a set of pumps including a first pump to house a first material and a second pump configured to house a second material different from the first material; an
a robotic dispensing system fluidly coupled to the set of pumps, wherein the robotic dispensing system includes a robotic arm and an end-effector tool having a mixing vessel and a nozzle fluidly coupled to the mixing vessel, wherein the nozzle is configured to dispense a third material on the tray in a defined pattern, wherein the third material is a mixture of the first material and the second material,
a thermal system including:
a first heated conduit fluidly coupled to the first pump and the end-effector tool, wherein the first heated conduit is configured to provide the first material to the end-effector tool at a first desired temperature, and
a second heated conduit fluidly coupled to the second pump and the end-effector tool, wherein the second heated conduit is configured to provide the second material to the end-effector tool at a second desired temperature, and
a controller configured to control operation of the material dispensing system; and
a vision system including a set of imaging devices configured to capture a first set of images of the nozzle in association with the tray and a second set of images of the defined pattern on the tray, wherein:
the controller is further configured to:
determine that a nozzle offset of the nozzle does not satisfy an offset threshold based on the first set of images,
determine an adjustment value of a position of the nozzle in response to the nozzle offset not satisfying the offset threshold,
control the position of the nozzle relative to the tray based on the adjustment value of the position of the nozzle, and
determine whether the defined pattern satisfies one or more desired characteristics based on the second set of images.

10. The system of claim 9, wherein the controller is configured to control the robotic dispensing system to dispense the third material in a serpentine shape, as the defined pattern, on the tray.

11. The system of claim 9, wherein the controller is configured to determine whether an idle time has lapsed and issue a purge notification to have a cleanse action performed on the end-effector tool in response to the idle time lapsing, and wherein the cleanse action includes removing the third material from the end-effector tool, providing a notification of the cleanse action, or a combination thereof.

12. The system of claim 9, wherein the one or more desired characteristics includes characteristics indicative of a bead width, a bead length, or a combination thereof.

13. The system of claim 9, wherein the set of imaging devices includes one or more three-dimensional imaging devices, one or more two-dimensional imaging devices, or a combination thereof.

14. The system of claim 9, wherein the set of imaging devices includes:
a first set of imaging devices configured to capture the first set of images, and
a second set of imaging devices configured to capture the second set of images.

15. The system of claim 9, wherein the nozzle offset is based on a distance between the nozzle and the tray.

16. A method of assembling a vehicle battery pack on a tray with a material dispensing system and a vision system, the material dispensing system including a set of pumps, a robotic dispensing system, and a controller, the method comprising:
providing a first material in a first pump and a second material in a second pump, wherein the set of pumps includes the first pump and the second pump;
operating, by the controller, the robotic dispensing system and the set of pumps to dispense a third material from a nozzle of an end-effector tool on a tray in a defined pattern, wherein the robotic dispensing system is fluidly coupled to the set of pumps, the robotic dispensing system includes a robotic arm and the end-effector tool having a mixing vessel and the nozzle fluidly coupled to the mixing vessel, wherein the third material is a mixture of the first material and the second material;
capturing, by a set of imaging devices of the vision system, a first set of images of the nozzle in association with the tray;
determining, by the controller, that a nozzle offset of the nozzle does not satisfy an offset threshold based on the first set of images;
determining, by the controller, an adjustment value of a position of the nozzle in response to the nozzle offset not satisfying the offset threshold;
controlling, by the controller, the position of the nozzle relative to the tray based on the adjustment value of the position of the nozzle offset as the third material is being dispensed;
capturing, by the set of imaging devices of the vision system, a second set of images of the tray having the third material with the defined pattern;
determining, by the controller, whether the defined pattern satisfies one or more desired characteristics based on the second set of images, wherein the one or more desired characteristics includes characteristics indicative of a bead width, a bead length, or a combination thereof; and
identifying, by the controller, the tray as being defective in response to the defined pattern no satisfying the one or more desired characteristics.

17. The method of claim 16 further comprising:
controlling, by a thermal system, a temperature of the first material to a first desired temperature and a temperature of the second material to a second desired temperature, wherein the thermal system includes:
a first heated conduit to provide the first material to the mixing vessel at the first desired temperature, and a second heated conduit to provide the second material to the mixing vessel at the second desired temperature.

18. The method of claim 16 further comprising:

determining, by the controller, whether an idle time has lapsed; and issuing, by the controller, a purge notification to have a cleanse action performed on the end-effector tool in response to the idle time lapsing.

* * * * *